W. J. WATT.
HOSE COUPLING.
APPLICATION FILED SEPT. 6, 1909.
949,608.
Patented Feb. 15, 1910.
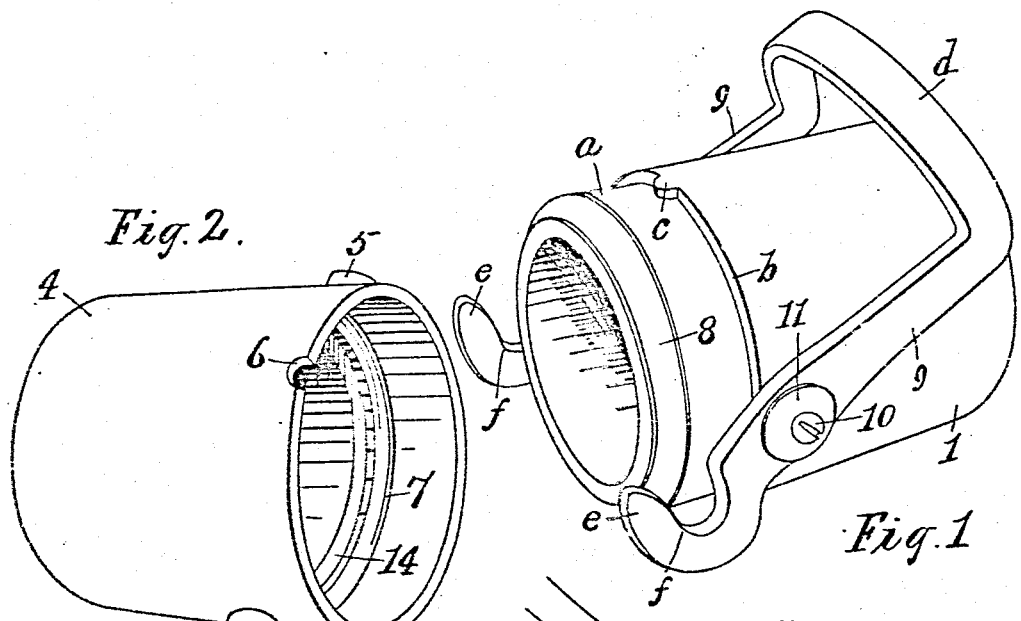
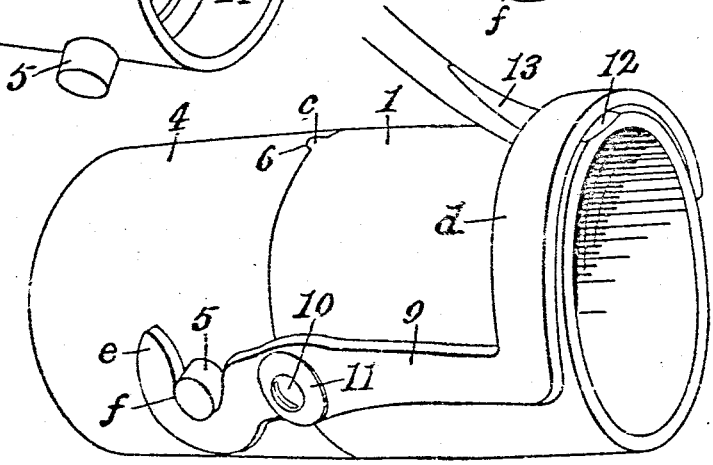
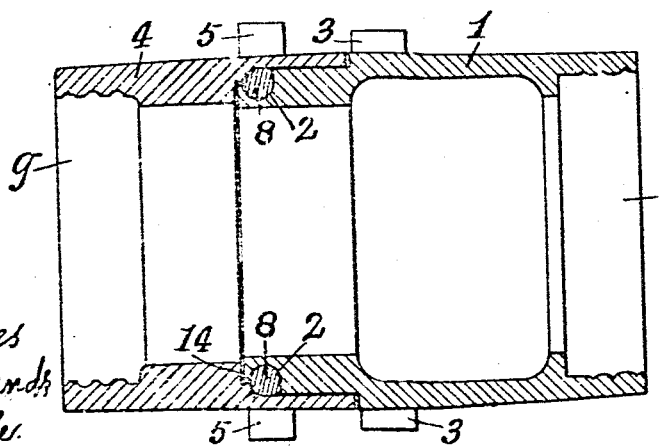
Witnesses
J. S. Edmunds
P. Prebble.
Inventor
William J. Watt
By
P. J. Edmund
Attorney

UNITED STATES PATENT OFFICE.

WILLIAM J. WATT, OF WOODSTOCK, ONTARIO, CANADA.

HOSE-COUPLING.

949,608.

Specification of Letters Patent.   Patented Feb. 15, 1910.

Application filed September 9, 1908.  Serial No. 452,342.

*To all whom it may concern:*

Be it known that I, WILLIAM J. WATT, a subject of the King of Great Britain, and a resident of Woodstock, in the county of Oxford, in the Province of Ontario, Canada, have invented a new and useful Hose-Coupling, of which the following is a specification.

This invention relates to a device for temporarily joining sections of hose end to end.

The object of this invention is to provide a pair of interlocking connecting pieces by means of which the ends of hose sections are readily and easily joined together in line, and so constructed that all possibility of leakage is avoided and completely prevented, greater pressure will therefore be maintained where this hose coupling is employed.

A further object is to enable hose sections to be joined together by one man, and more easily and rapidly than two men can couple the hose sections together with the hose couplings in ordinary use, and a further object is to provide a device that is simple, strong and durable in construction and one that can be manufactured at a considerably less cost than the hose couplings in ordinary use. And this invention consists of the improved construction and novel combination of parts of two interlocking connecting pieces, as will be hereinafter first fully set forth and described and then pointed out in the claim, reference being had to the accompanying drawings forming part of this specification, wherein:—

Figures 1 and 2 are perspective views of the entering and receiving interlocking sections of my improved hose coupling. Fig. 3 is another perspective view of same, showing the interlocking sections coupled together. Fig. 4 is a central longitudinal sectional view of the interlocking sections of the hose coupling, showing their position when coupled together.

Further describing my invention with reference to the accompanying drawings, the numeral 1 designates the entering or male interlocking tubular section of my improved hose coupling, and is provided with an annular groove or recess 2 and oppositely disposed trunnions 3; a portion of the outer face of said interlocking section 1 is formed narrower in cross section at one end as shown at, *a*, in Fig. 1, to form a shoulder, *b*, which extends entirely around said section, 1, and extending from said shoulder, *b*, over on said portion, *a*, is a registering projection, *c*.

4 is the receiving or female interlocking tubular section provided with studs 5, a notch 6 to receive the projection *c* and with internal curved shoulder 7.

8 is a packing ring of rubber or other expansible material which is securely held in place on said interlocking section 1 by being fitted to and inserted in the groove 2 formed in said interlocking section 1.

9 are levers coupled together at one end by the yoke, *d*, and on the other end of each of said levers 9 hooks *e*, are formed, and, *f*, is a shallow recess formed in each of said hooks, *e*, of said levers 9. The levers 9 are pivotally mounted on the trunnions 3 with which the interlocking section 1, of the hose coupling is provided.

10 is a screw which is secured in a screw threaded socket in each of said trunnions 3, and 11 is a washer on each of said screws 10 which washer is interposed between the end of the trunnion 3 and the head of the screw 10 to securely hold the levers 9 on said trunnions 3.

12 is a shallow recess formed in the outer face of the interlocking section 1 which recess is arranged to come under the yoke, *d*, when the latter is closed on the section 1 as shown in Fig. 3, and 13 is a short metallic bar flattened at one end which as shown in Fig. 3 is adapted to be inserted in the shallow recess 12 beneath the yoke, *d*, and between the latter and the interlocking section 1.

14 is an inner square shoulder also formed on the inner face of the section 4.

The ends of the sections of the hose, not shown, may be inserted and secured in the ends, *g*, and, *h*, of the interlocking sections 4 and 1 by means of expansion collars, or in any manner or by any means found most suitable or convenient.

When the ends of lengths of fire or other hose are secured in the ends of the interlocking sections 1 and 4, the latter are firmly and securely joined together as follows:

The reduced end portion, *a*, at the free end of the interlocking section, 1, is fitted to and adapted to enter and slide freely into the free end of the interlocking section 4, until the shoulder, *b*, is only slightly separated from the adjacent end of the interlocking section 4, when so adjusted the end of the interlocking section 1 is only slightly separated from the shoulder 14 in the section 4.

When the end, a, of the section 1 opposite the end of the section, 4, is adjusted to bring the projection, c, on the section 1 in line with the notch 6 on the section 4, the studs 5 will be in line with and in proper position to be engaged with by the hooked ends, e, of the levers 9.

When so adjusted the yoked levers 9 are in the position shown in Fig. 1, when by pressing the yoke, d, toward the coupling until the said yoke abuts against said coupling the hooked ends, e, of said levers 9 will engage with the studs 5, as shown in Fig. 3, and the coupling sections 1 and 4 firmly and securely joined together.

When adjusting the levers 9 from the position shown in Fig. 1, to the position shown in Fig. 3, just at the completion of this operation, the shallow recesses, f, are so arranged to come opposite the studs 5 and the latter snap or click into said recesses, f; this locks and firmly secures said hooked ends, e, of said levers 9 on said studs 5, so that an excess of or more than ordinary force will have to be applied to said levers 9 in order to disengage them from said studs 5. As the hooked ends, e, of said levers 9 are adjusted from the position shown in Fig. 1 to the position shown in Fig. 3, the annular packing ring 8 of rubber or other expansible material in the annular groove or recess 2 is compressed tightly against the interlocking section 1 and against the curved shoulder 7 on the interior face of the interlocking section 4.

The interlocking sections 1 and 4 therefore, are not only firmly joined and locked together but the packing ring 8 arranged and secured in place as described avoids and completely prevents any possibility of leakage.

As the only operation that is required to join these interlocking sections 1 and 4 together, is to slide one interlocking section into the other and press the yoke, d, against the coupling, the joining of a hose section or sections together may be more rapidly and easily accomplished by one man where this coupling is employed, than can be accomplished by two men with the hose couplings in ordinary use.

To unlock the coupling sections 1 and 4 in order to separate them, all that is necessary to do is to insert the flattened end of the bar 13 in the shallow recess 12 under the yoke, d, and pry up the latter until the hooks, e, of the levers 6 are disengaged from the studs 5, when the hose sections may be readily and easily separated by withdrawing the section 1 from the section 4.

When the interlocking sections 1 and 4 are separated, the fact that the expansible packing ring 8 is inserted in the groove 2, all possibility of it becoming accidentally detached or lost is avoided. Again as the interlocking sections 1 and 4 do not require the screw threads or rotating shouldered sleeves of the hose couplings in ordinary use, my hose coupling will cost very much less to manufacture, will consequently be very simple in construction, at the same time, strong and durable and efficient in operation.

Having thus described my invention, I claim:

A hose coupling comprising a male member and a female member, said male member having a reduced entering end portion of two diameters whereby a pair of shoulders are provided on said reduced portion, that portion of smaller diameter provided at a point removed from the outer end thereof with an annular seat of semi-circular shape in cross-section, said seat terminating in a shoulder formed by that portion of smaller diameter, a projection carried by the shoulder formed by that portion of larger diameter and projecting upon said portion of larger diameter, and trunnions carried by opposite sides of said male member, said female member provided with two interior stepped annular shoulders and having a notch in the inner end to receive the projection on said male member, a gasket mounted in said seat and against that shoulder formed by that portion of smaller diameter and adapted to engage one of the shoulders in said female member, the other of said shoulders adapted to engage the inner end of the male member, studs carried on opposite sides of the female member and locking means for said members comprising side arms pivoted on the trunnions of the male member and connected at one end by a yoke integral therewith, the other ends of said arms projecting beyond the trunnions and being hook shaped to receive the studs on the female member.

In testimony whereof, I have signed in the presence of the two undersigned witnesses.

WILLIAM J. WATT.

Witnesses:
N. MOULDING BAKER,
ALEX BORLAND.